US012400812B2

(12) United States Patent
Panto et al.

(10) Patent No.: US 12,400,812 B2
(45) **Date of Patent: *Aug. 26, 2025**

(54) INLINE DISCONNECT FOR MULTIPHASE ELECTRIC UTILITY LINE APPLICATIONS

(71) Applicant: Southern Electrical Equipment Company, Inc., Charlotte, NC (US)

(72) Inventors: Andrew S. Panto, Waxhaw, NC (US); Barry Craig Thomas, Charlotte, NC (US); Doug Lanter, Richburg, SC (US); Dillon Surface, Indian Trail, NC (US)

(73) Assignee: SOUTHERN ELECTRICAL EQUIPMENT COMPANY, INC., Charlotte, NC (US)

( * ) Notice: Subject to any disclaimer, the term of this patent is extended or adjusted under 35 U.S.C. 154(b) by 212 days.

This patent is subject to a terminal disclaimer.

(21) Appl. No.: 18/197,489

(22) Filed: May 15, 2023

(65) Prior Publication Data

US 2023/0282432 A1 Sep. 7, 2023

Related U.S. Application Data

(63) Continuation of application No. 17/358,462, filed on Jun. 25, 2021, now Pat. No. 11,688,572.

(60) Provisional application No. 63/046,250, filed on Jun. 30, 2020.

(51) Int. Cl.

| | |
|---|---|
| ***H01H 33/666*** | (2006.01) |
| ***H01H 1/66*** | (2006.01) |
| ***H01H 3/26*** | (2006.01) |
| ***H01H 33/28*** | (2006.01) |
| ***H01H 33/668*** | (2006.01) |

(52) U.S. Cl.

CPC .......... *H01H 33/6661* (2013.01); *H01H 1/66* (2013.01); *H01H 3/26* (2013.01); *H01H 33/28* (2013.01); *H01H 33/666* (2013.01); *H01H 33/668* (2013.01)

(58) Field of Classification Search

CPC ........... H01H 1/66; H01H 3/26; H01H 9/167; H01H 33/28; H01H 33/66; H01H 33/666; H01H 33/668; H01H 33/022; H01H 33/36; H01H 33/6661; H01H 31/32

USPC .................................. 361/130–132; 218/120

See application file for complete search history.

(56) References Cited

U.S. PATENT DOCUMENTS

| | | | | | |
|---|---|---|---|---|---|
| 4,591,678 | A | | 5/1986 | Mn | |
| 4,677,262 | A | | 6/1987 | Ramos et al. | |
| 5,075,521 | A | * | 12/1991 | Rogers .................. | H01H 33/02 218/84 |
| 5,560,474 | A | * | 10/1996 | Thomas ................ | H01H 31/00 200/49 |

(Continued)

*Primary Examiner* — William A Bolton

(74) *Attorney, Agent, or Firm* — Bryan L. Baysinger; Maynard Nexsen PC

(57) ABSTRACT

A group-operated switching system for multi-phase electrical transmission lines including a number of inline axial switches for opening and closing circuits to control electrical flow through the transmission lines. The switches include axially mounted load break vacuum interrupters and are mechanically and electrically isolated from each other and from a control box. The control box communicates with the inline switches via RF communications. Power for the switch electronics and operations can be provided from line power, a battery, or a capacitive source.

20 Claims, 8 Drawing Sheets

(56) References Cited

U.S. PATENT DOCUMENTS

| | | | | |
|---|---|---|---|---|
| 5,874,900 | A | 2/1999 | Panto | |
| 7,026,558 | B1 * | 4/2006 | Andreyo | H01H 3/58<br>200/17 R |
| 7,701,688 | B2 * | 4/2010 | Jeon | H02G 13/40<br>361/111 |
| 7,745,753 | B2 * | 6/2010 | Schafer | H01H 3/3015<br>200/400 |
| 9,966,207 | B1 | 5/2018 | Cleveland | |
| 10,566,156 | B1 | 2/2020 | Kowalik et al. | |
| 10,622,175 | B2 * | 4/2020 | Kowalik | H01H 33/14 |
| 2002/0088775 | A1 | 7/2002 | Bridges | |
| 2018/0321285 | A1 | 11/2018 | Keister et al. | |

* cited by examiner

INLINE DISCONNECT FOR MULTIPHASE ELECTRIC UTILITY LINE APPLICATIONS

CROSS REFERENCE TO RELATED APPLICATIONS

This application claims priority to and benefit of U.S. Provisional Patent Application No. 63/046,250, filed on Jun. 30, 2020, and U.S. Non Provisional patent application Ser. No. 17/358,462, filed Jun. 25, 2021, the entirety of which is incorporated by reference herein.

FIELD OF THE INVENTION

The present invention relates generally to group-operated switches for electric utility line applications, and more particularly to an inline disconnect for group-operated multi-phase switches that are not mechanically or electrically linked and incorporate interrupting and sensing devices that operate in an axial direction with the switches.

BACKGROUND OF THE INVENTION

Conventional electric utility lines are generally arranged wherein alternating currents of differing phases are carried on separate lines from point to point, each supported on the same pole. Each line carries a phase of AC that is offset, for example by 120° in a three-phase arrangement, from the others. These lines are arranged one over the other on the utility pole, a configuration that is described as "phase over phase." These lines are generally under high tension between poles. At one or more poles along a given set of lines, a set of switches provides a means by which the electric utility may connect or disconnect the circuit. Such connects or disconnects may be a part of normal operation, or they may be used to facilitate repair work on the lines These switches are generally arranged to provide for connect or disconnect of all three phases as a group. Conventionally, the switches are operated by rotating the switch arms through a predetermined arc using a shaft that connects all three switch arms. This permits all the switches to be operated. i.e. opened or closed, simultaneously. This arrangement is enormously complicated for several reasons. Because the three lines must be kept electrically isolated from each other and from the switch operator, the operator shaft must be fully insulated. The switch arms must also be kept in correct alignment to operate correctly and reliably. This can present additional engineering challenges in real-world conditions, particularly at the installation stage; Load Break devices such as vacuum interrupters and their associated operating linkages are mounted outside of the switch path causing electrical clearance issues; site-specific application engineering is generally required, thus increasing installation time and expense. Additionally, the placement of group-operated switches on a pole generally requires additional switch-related structures to be installed, in order to carry out the switching function.

What is needed is an inline Load break disconnect for group-operated switches that are not mechanically or electrically linked, that permit easy installation on standard poles without specialized switch-related structures, and that do not require site-specific application engineering.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention; its sole purpose is to present concepts of the invention in a simplified form as a prelude to the more detailed description that is subsequently presented.

In view of the foregoing needs, the present invention includes apparatuses, systems, and methods including an inline disconnect component for multiphase electric utility applications. One system may include an inline, load break multi three-phase disconnect component for an electric utility line component. In one embodiment, the load break disconnect component may include load break vacuum bottle interrupters that are mounted axially inline with a switch blade to substitute or replace more traditional switches that operate based upon mechanical rotation. One or more load break vacuum bottles may be arranged in series and/or in parallel to permit switching at a desired voltage rating. A vacuum interrupter column may hang parallel beneath a traditional strain insulator and/or conductor and may move inline with the switch as it operates. This inline switch may then be placed in series with another strain insulator, thus allowing the line to be insulated to ground.

In another embodiment, a group-operated switching system for multi-phase electrical transmission lines including a plurality of inline axial switches; a plurality of electrical transmission lines, each of the inline axial switches being disposed within one of the transmission lines for selective opening and closing, each of the inline axial switches having at least one load break vacuum interrupter operable to control electrical flow through one of the electrical transmission lines; and a control box connected to the plurality of inline axial switches via radio frequency transmission and reception, for controlling operation of the plurality of inline axial switches and providing status information to a user. In this embodiment, each of the plurality of inline axial switches may have an electronic component for controlling operation and providing status information; and wherein the plurality of inline axial switches are adapted for group operation and are mechanically and electrically isolated from each other and from the control box.

In another embodiment, the inline axial switches described above may include a motorized cabinet for actuating the one inline axial switch. Further, the motorized cabinet and inline axial switch electronic component may be powered from line power, from line power using a current transformer, from a battery, or from a capacitive source.

In still another embodiment, the load break vacuum interrupter described above is operable in high-voltage, high-current load conditions.

In yet another embodiment, a switching system for an electrical transmission line may including an inline switch disposed within a transmission line for selective opening and closing, the inline switch having at least one load break vacuum interrupter electronically operable to control electrical flow through the transmission line; and a control box connected to the inline switch via radio frequency transmission and reception, for controlling operation of the inline switch and providing status information to a user; wherein the inline switch is mechanically and electrically isolated from the control. In this embodiment, the inline switch may include a motorized cabinet for actuating the at least one load break vacuum interrupter; and switch electronics for communicating with the control box and for controlling the motorized cabinet.

In still another embodiment, an improved arrangement for group-operated switches for electrical transmission lines, includes: a) a utility pole for supporting a plurality of electrical transmission lines; b) a plurality of first strain insulators for insulating the plurality of electrical transmission lines to ground, each of the first strain insulators being connected to the pole; c) a plurality of second strain insulators, each of the second strain insulators being connected to one of the first strain insulators and one of the electrical transmission lines; d) a plurality of inline switches, each disposed within one of the electrical transmission lines and each being connected across one of the second strain insulators; and e) a control box disposed at the utility pole, for controlling, through RF communications, operation of the plurality of inline switches to control electrical flow through the plurality of electrical transmission lines; each of the plurality of inline switches including at least one vacuum interrupter for selectively opening or closing a circuit that includes the electrical transmission line upon which the inline switch operates, each of the plurality of inline switches including a motorized cabinet housing, a gear drive mechanism 303 for actuating the vacuum interrupter 401, and control electronics for communicating with the control box 300 and controlling the gear drive mechanism 303, and each of the plurality of inline switches being electrically and mechanically isolated from the other inline switches and from the control box 300. In this embodiment, each of the inline switches includes a gear drive mechanism 303 housed in a motorized cabinet for actuating the inline switch.

Each line for which group-operated switching is required may be provided with a switch arrangement as provided above. The chief advantage of using a switch arrangement of this type is the elimination of the mechanical linkage between switches. Instead of a moving mechanical linkage, the stacked vacuum interrupter bottles may be activated by the movement of a non-rotating blade that may be driven axially by a motorized cabinet. An RF transmitter-receiver combination may be used both for status indication (open or closed) and control (open or close) of the gear drive mechanism.

In an additional feature of the invention, the power for system electronics and gear drive mechanism actuation may come from a capacitive source, a silicon-iron core current transformer, batteries, power over fiber, or a capacitor. Depending upon the particulars of the configuration and usage, this feature may permit the system to be charged from line power as well as solar.

In operation, each of the three phase sets may be mechanically and electrically isolated from the other phase sets. Each set may include a set of switches in communication with a transceiver. At the base of a pole, a control box may coordinate operation of all three phases simultaneously, via RF-based communications. In the event of a failure of one of the three phases, the control box may be configured and programmed to return the operational phases to the same open or closed state as the failed unit. A remote contact may be provided to a remote telemetry unit or other communications device in order to transfer the failure status information to a supervisory control and data acquisition (SCADA) system.

Other features and their advantages will be readily apparent to those skilled in the arts, techniques and equipment relevant to the present invention from a careful reading of the Detailed Description of Preferred Embodiments.

DETAILED DESCRIPTION OF PREFERRED EMBODIMENTS

The present invention includes systems, arrangements, and methods for providing an improved switching system for an electrical transmission lines.

Figure 1A:
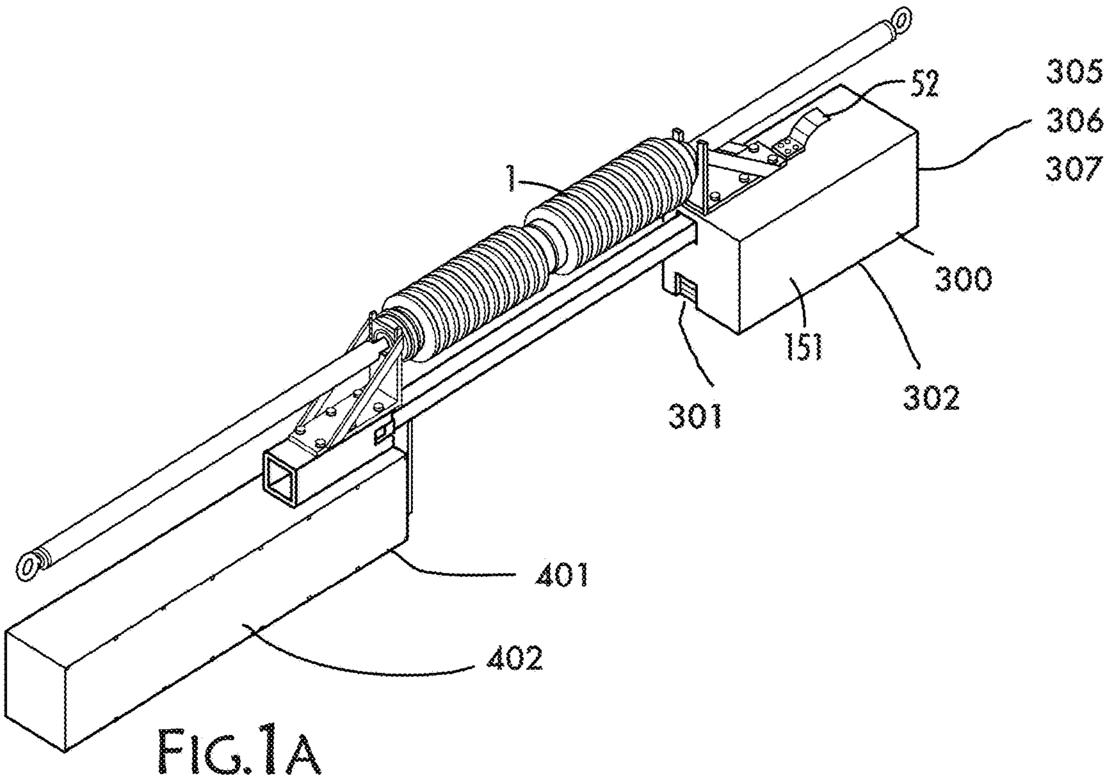
FIG. 1A is a front perspective view of a single phase of an inline three-phase disconnect according to the present invention in the fully closed position.
Figure 1B:
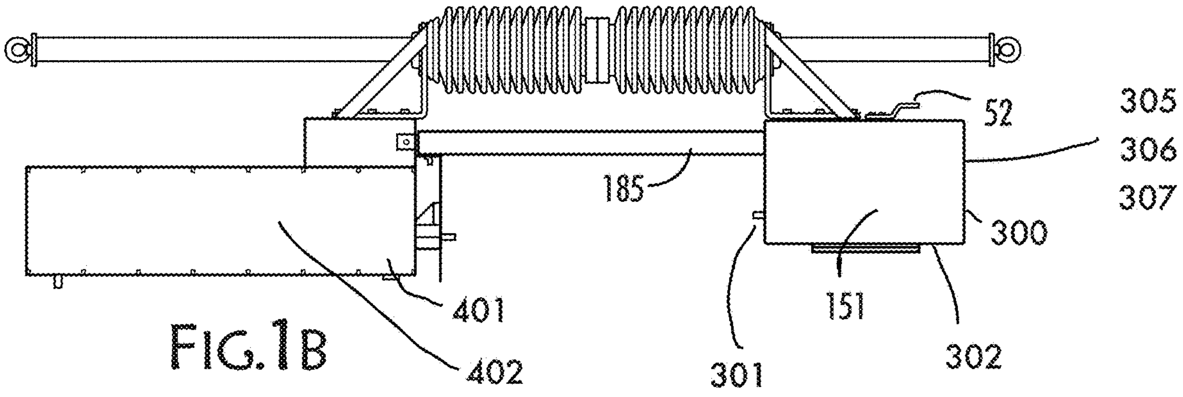
FIG. 1B is front elevation view of FIG. 1A.
Figure 2A:
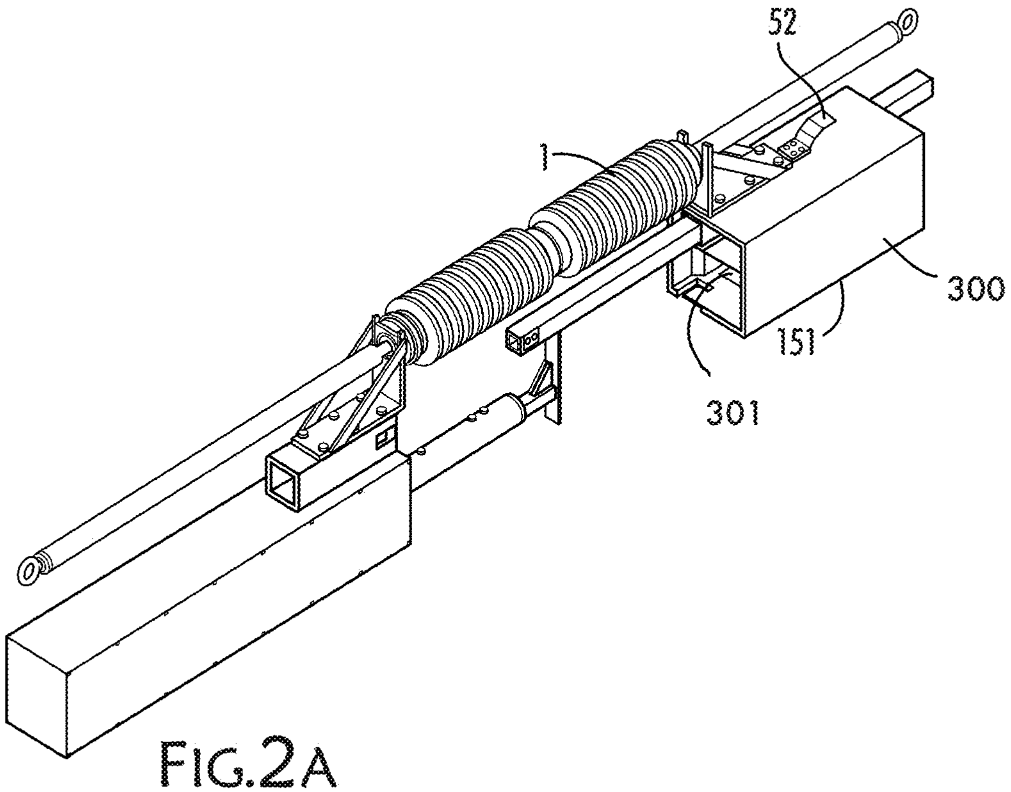
FIG. 2A is a front perspective view of a single phase of an inline three-phase disconnect according to the present invention in the 25% partially open position.
Figure 2B:
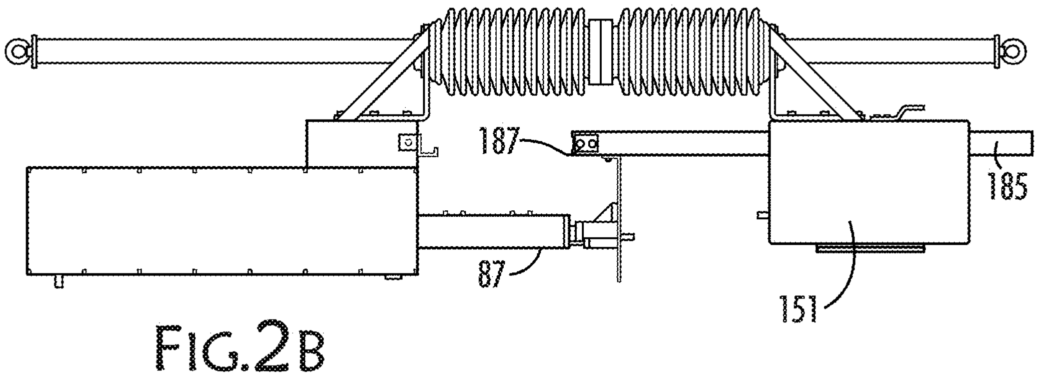
FIG. 2B is a front elevation view of FIG. 2A.
Figure 3A:
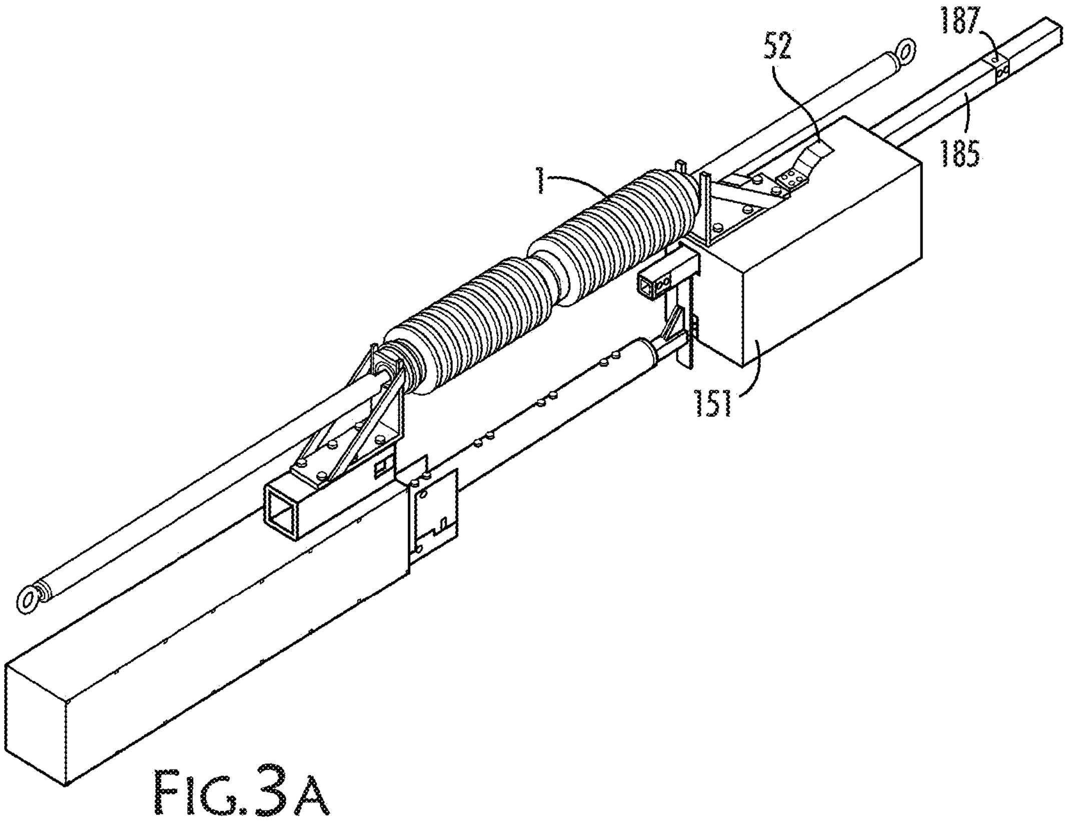
FIG. 3A is a front perspective view of a single phase of an inline three-phase disconnect according to the present invention in the 50% partially open position.
Figure 3B:
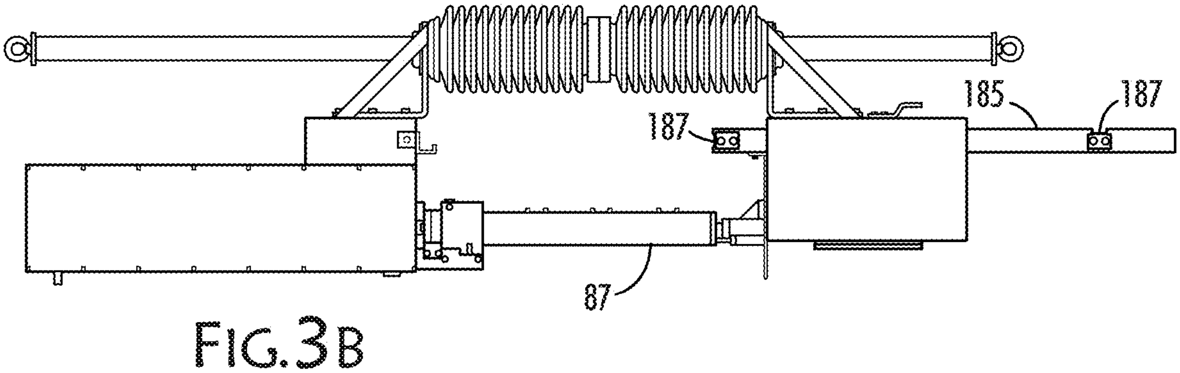
FIG. 3B is a front elevation view of FIG. 3A.
Figure 4A:
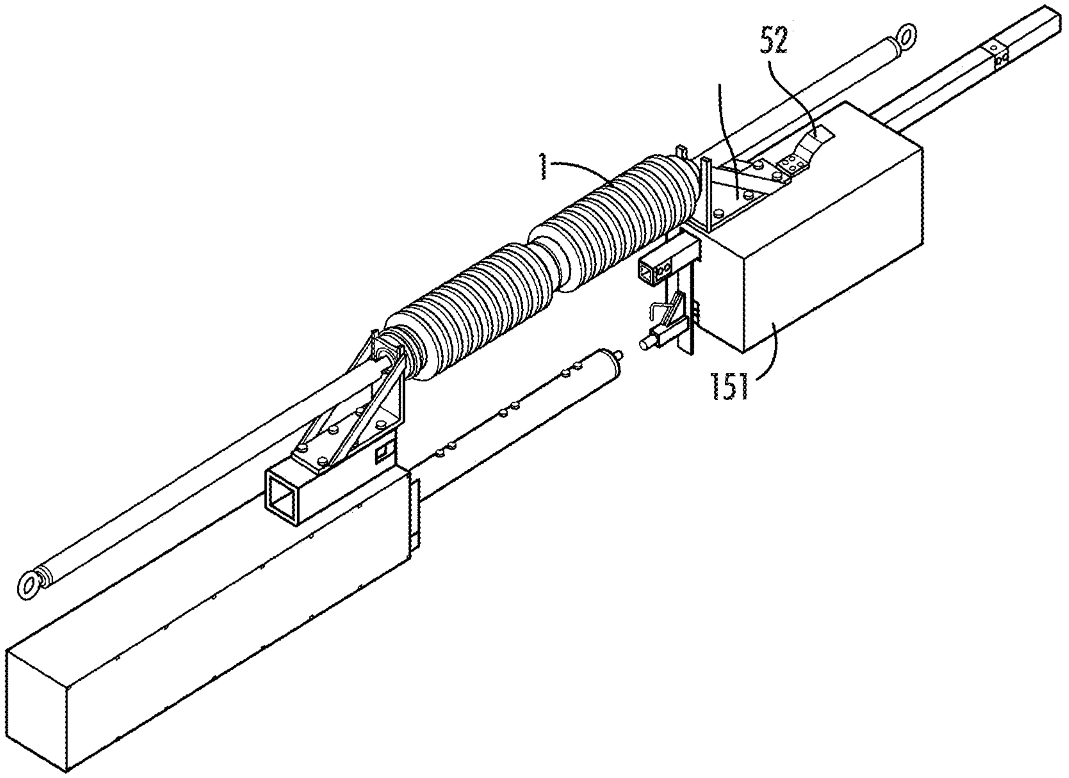
FIG. 4A is a front perspective view of a single phase of an inline three-phase disconnect according to the present invention in the 75% partially open position.
Figure 4B:
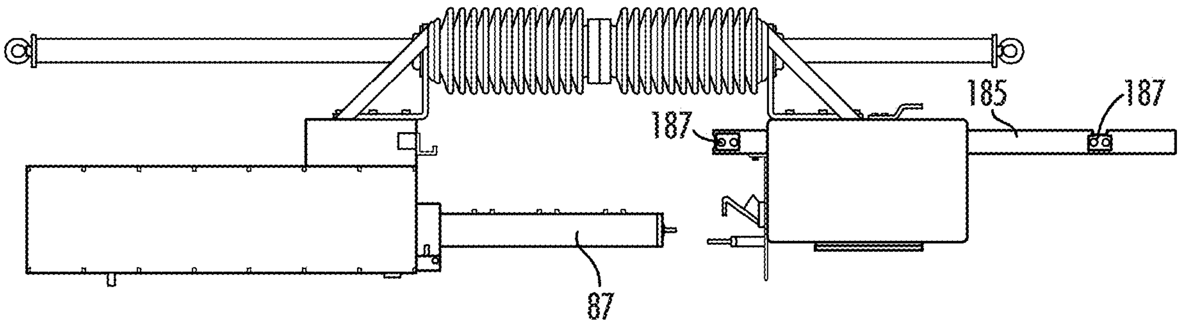
FIG. 4B is a front elevation view of FIG. 4A.
Figure 5A:
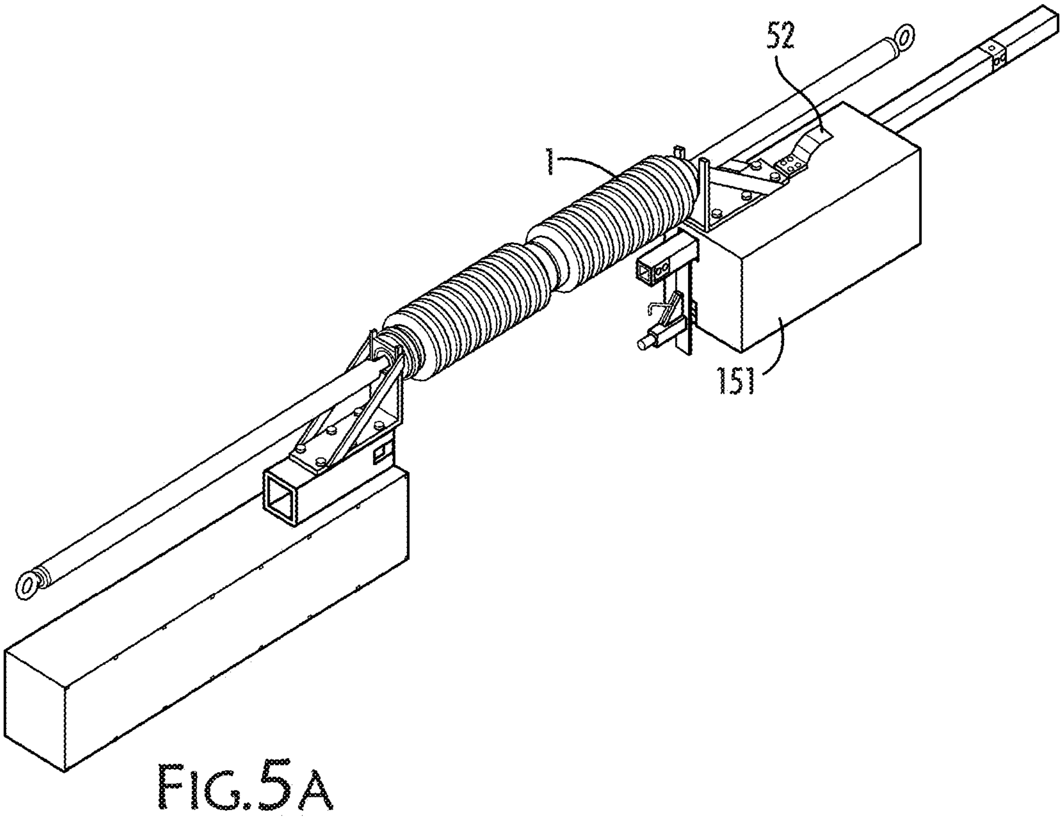
FIG. 5A is a front perspective view of a single phase of an inline three-phase disconnect according to the present invention in the fully open position.
Figure 5B:
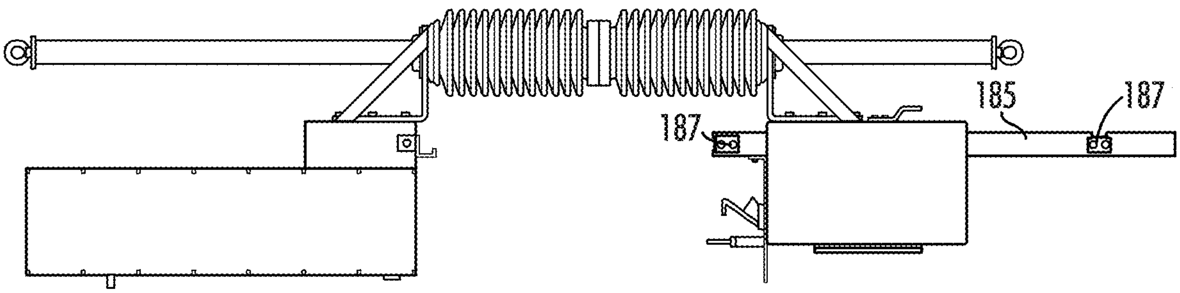
FIG. 5B is a front elevation view of FIG. 5A.
Figure 6:
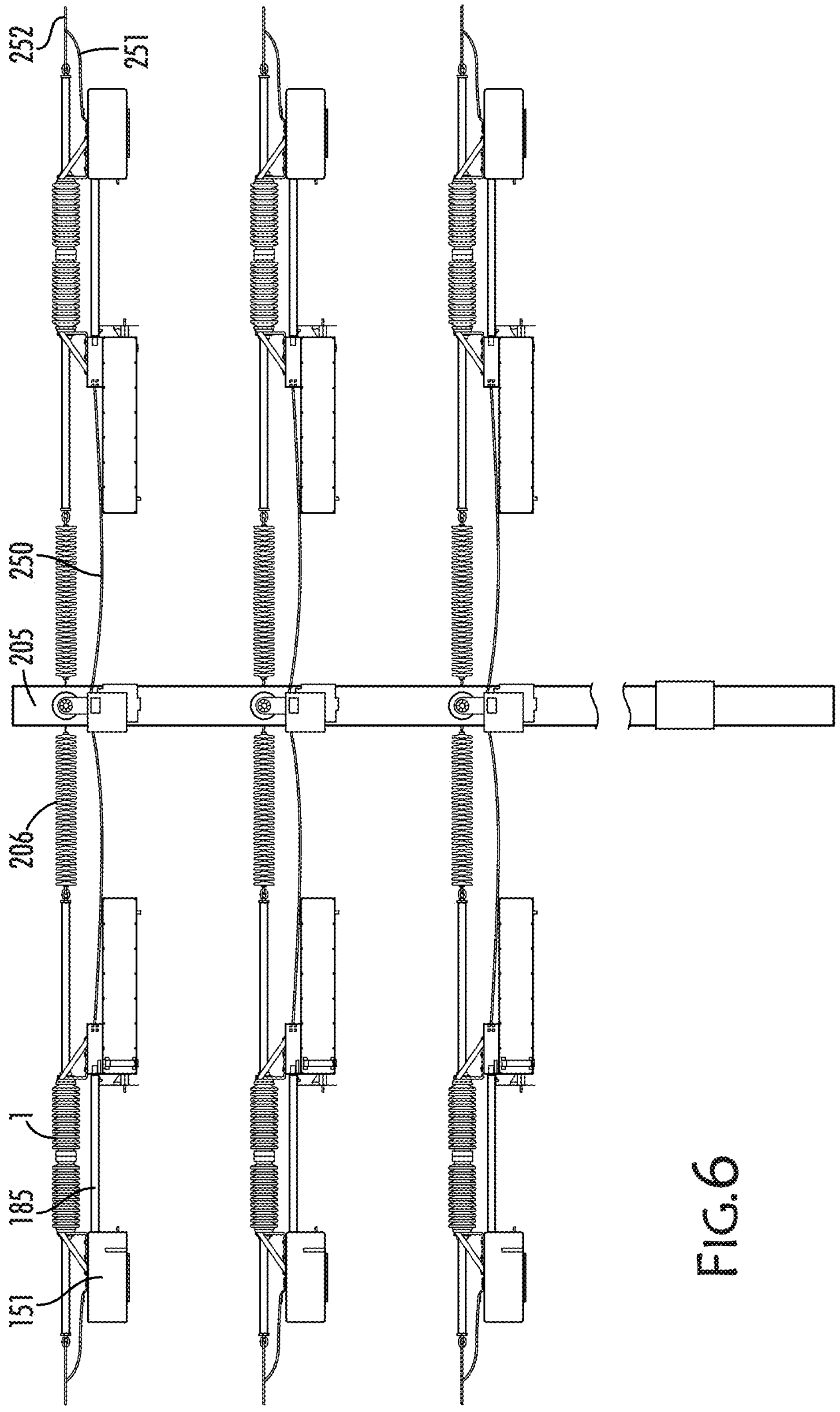
FIG. 6 is an elevation view of the inline switches in the closed position.
Figure 7:
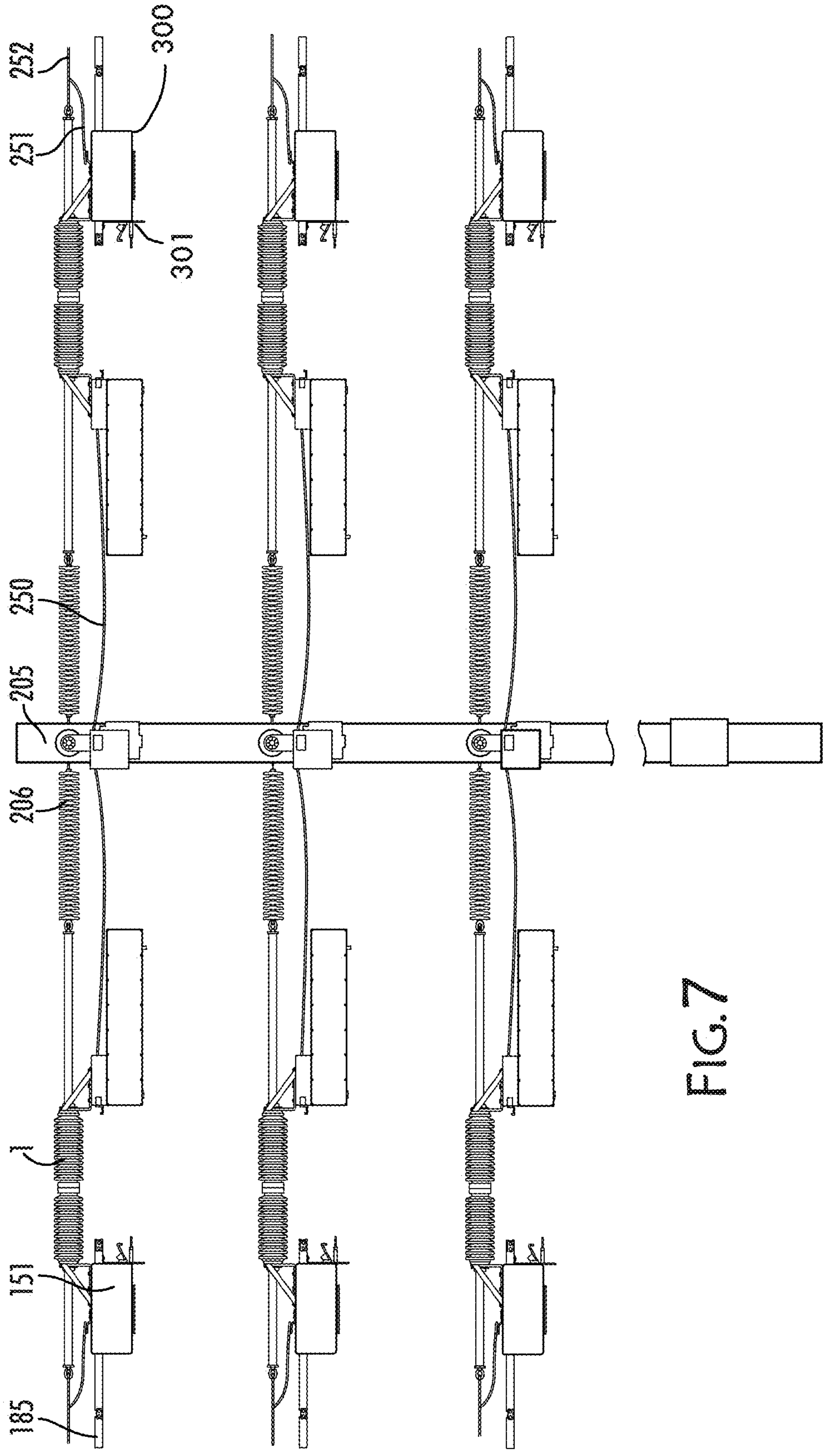
FIG. 7 is an elevation view of the inline switches in the open position.
Figure 8:
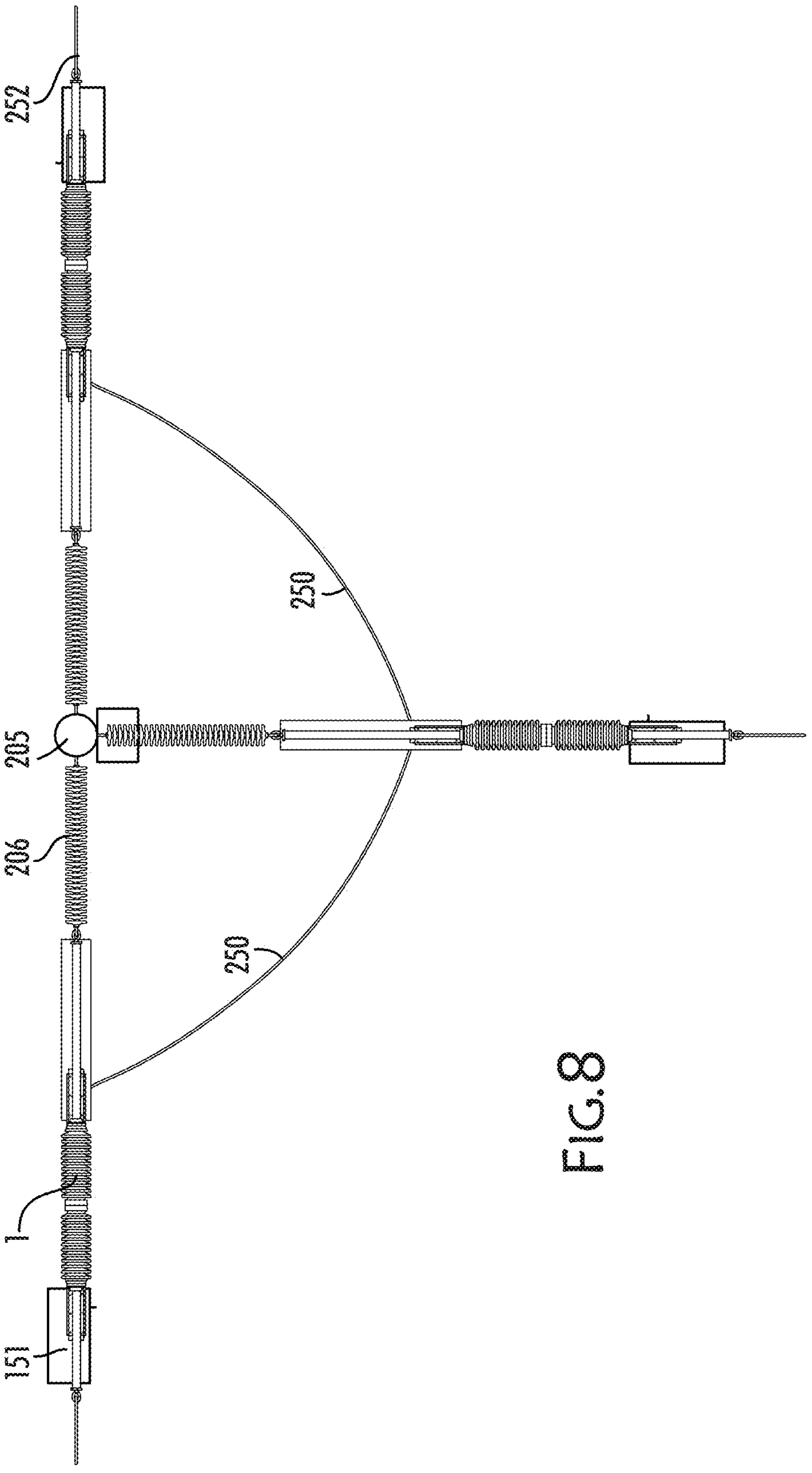
FIG. 8 is a top view of the inline switches in a 3-way configuration.

Referring now to the drawings, FIGS. 1A-5B illustrate one embodiment of the present system, which includes the sequence of operation of a disconnect blade 185 and an interrupter 87. During operational cycles from the closed state to the open state and the reverse cycle of the open state to the closed state all mechanical linkages stay in the same clearance envelope while traveling inline with the original orientation. This movement is critical in keeping balanced line loads as well as clearance gaps between circuit legs during operational cycles. FIG. 6 illustrates the general arrangement of a device according to the present invention. An electric utility pole 205 carries electrical lines 250-252 each associated with one of three phases I, II, III of AC electric power. Each line is attached to the pole and insulated from ground using three strain insulators 206. The current path enters the pole region and travels through the switch disconnect blade 185 that has been connected across an outermost strain insulator 1. This switch disconnect blade 185 provides an open air gap and thus a visual indicator that the line has been disconnected and the circuit broken as shown in FIG. 7. When the switch disconnect blade 185 is closed (as shown in FIG. 6), current may travel through and exit to terminal pad connection 52. This switch will be discussed in greater detail below. The inline interrupter 87 is not in the circuit when the disconnect switch 185 is closed. The disconnects 185 may be conveniently grouped into switch groups A. B, and C, each associated with a run of transmission lines.

In a preferred embodiment, the inline interrupter 87 includes a set of 38 kV loadbreak vacuum bottles 402 having up to 3000 A current ratings. These vacuum bottles 402 are arranged in series and allow up to 230 kV switching or greater, in accordance with industry requirements. Vacuum bottles may also be arranged in parallel to permit higher current ratings if required. The stacked vacuum interrupter bottles are activated by a toggle mechanism that actuates based on switch travel from the motorized cabinet to open and close the vacuum contacts. The motorized cabinet is powered from one of several possible sources, such as a capacitive source 305 (appropriate in conditions of high voltage but no current), a silicon-iron core current transformer 306 (appropriate in conditions where current and voltage are available from the electric line), a battery 307 (appropriate for solar applications), a capacitor, or a combination of the listed sources.

The motorized cabinet 151 (schematically depicted in the drawings) is provided with an RF transceiver that is configured to transmit signals regarding the status of the switch (i.e., open or closed) as well as to receive control signals from a control box 300 (see FIG. 7) located in an accessible position on the pole. Power for the electronics may also be provided from the same source as power for the motorized cabinet. This arrangement permits the switch to be powered from a storage source regardless of the availability of line power, although when line power is usually available (such as when a switch is normally closed), charging the storage source from line power is preferred. Because the time required to charge the storage source may be quite long, the storage source should be selected so as to permit a large number of operational cycles.

The transceiver described above is configured to be in communication with the control box 300. The control box is configured to receive RF signals from each of the switches under its control. These RF signals indicate whether the switch is open or closed. The control box is also configured to transmit RF signals to each of the switches under its control, to actuate the gear drives to close or open the switches as a group, depending upon the desired state of operation. This arrangement also affords a degree of error-checking, in that a switch that is in the incorrect position due to a failure of some sort will report the failure to its control box. The control box may then return the operational phases to the same state, open or closed, as the failed unit. This error state may also be reported to a remote telemetry unit or to SCADA unit for further handling.

In this manner, an inline three-phase disconnect for electrical utility line applications may be conveniently and economically provided. Because this arrangement is mechanically and electrically isolated with respect to each current phase, the need for elaborate insulation schemes and support structures is greatly reduced if not eliminated. Moreover, because the operation of the group of switches is not limited to configurations that can be conveniently mechanically linked for group operation, little if any site-specific application engineering is required. These factors also greatly reduce the time required to plan and install switches of this type and use, which results in a labor and downtime savings to the electric utility.

In another embodiment, a group-operated switching system for multi-phase electrical transmission lines including a plurality of inline axial switches; a plurality of electrical transmission lines, each of the inline axial switches being disposed within one of the transmission lines for selective opening and closing, each of the inline axial switches having at least one load break vacuum interrupter operable to control electrical flow through one of the electrical transmission lines; and a control box connected to the plurality of inline axial switches via radio frequency transmission and reception, for controlling operation of the plurality of inline axial switches and providing status information to a user. In this embodiment, each of the plurality of inline axial switches may have an electronic component for controlling operation and providing status information; and wherein the plurality of inline axial switches are adapted for group operation and are mechanically and electrically isolated from each other and from the control box.

In another embodiment, the inline axial switches described above may include a motorized cabinet for actuating the one inline axial switch. Further, the motorized cabinet and inline axial switch electronic component may be powered from line power, from line power using a current transformer, from a battery, or from a capacitive source.

In still another embodiment, the load break vacuum interrupter described above is operable in high-voltage, high-current load conditions.

In yet another embodiment, a switching system for an electrical transmission line may include an inline switch disposed within a transmission line for selective opening and closing, the inline switch having at least one load break vacuum interrupter 401 electronically operable to control electrical flow through the transmission line; and a control box 300 connected to the inline switch via radio frequency transmission and reception, for controlling operation of the inline switch and providing status information to a user; wherein the inline switch is mechanically and electrically isolated from the control. In this embodiment, the inline switch may include a motorized cabinet for actuating the at least one load break vacuum interrupter; and switch electronics 301 for communicating with the control box 300 and for controlling the motorized cabinet.

In still another embodiment, an improved arrangement for group-operated switches for electrical transmission lines, includes: a) a utility pole for supporting a plurality of electrical transmission lines; b) a plurality of first strain insulators for insulating the plurality of electrical transmission lines to ground, each of the first strain insulators being connected to the pole; c) a plurality of second strain insulators, each of the second strain insulators being connected to one of the first strain insulators and one of the electrical transmission lines; d) a plurality of inline switches, each disposed within one of the electrical transmission lines and each being connected across one of the second strain insulators; and e) a control box disposed at the utility pole, for controlling, through RF communications, operation of the plurality of inline switches to control electrical flow through the plurality of electrical transmission lines; each of the plurality of inline switches including at least one vacuum interrupter for selectively opening or closing a circuit that includes the electrical transmission line upon which the inline switch operates, each of the plurality of inline switches including a motorized cabinet housing, a gear drive mechanism for actuating the vacuum interrupter, and control electronics for communicating with the control box and controlling the gear drive mechanism, and each of the plurality of inline switches being electrically and mechanically isolated from the other inline switches and from the control box. In this embodiment, each of the inline switches includes a gear drive mechanism housed in a motorized cabinet for actuating the inline switch.

Each line for which group-operated switching is required may be provided with a switch arrangement as provided above. The chief advantage of using a switch arrangement of this type is the elimination of the mechanical linkage between switches. Instead of a moving mechanical linkage, the stacked vacuum interrupter bottles may be activated by the movement of a non-rotating blade that may be driven axially by a motorized cabinet. An RF transmitter-receiver combination may be used both for status indication (open or closed) and control (open or close) of the gear drive mechanism.

In an additional feature of the invention, the power for system electronics and gear drive mechanism actuation may come from a capacitive source, a silicon-iron core current transformer, batteries, power over fiber, or a capacitor. Depending upon the particulars of the configuration and usage, this feature may permit the system to be charged from line power as well as solar.

In operation, each of the three phase sets may be mechanically and electrically isolated from the other phase sets. Each set may include a set of switches in communication with a transceiver. At the base of a pole, a control box may coordinate operation of all three phases simultaneously, via RF-based communications. In the event of a failure of one of the three phases, the control box may be configured and programmed to return the operational phases to the same open or closed state as the failed unit. A remote contact may be provided to a remote telemetry unit or other communications device in order to transfer the failure status information to a supervisory control and data acquisition (SCADA) system.

In view of the aforesaid written description of the present invention, it will be readily understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

What is claimed is:

1. A switching system for controlling current through a transmission line, comprising:

an inline switch disposed within the transmission line, the inline switch comprising a disconnect blade and an interrupter having a non-rotating blade driven axially by a motorized cabinet and mounted axially inline with the disconnect blade; and a control box connected to the motorized cabinet for remotely controlling operation of the inline switch, the inline switch mechanically and electrically isolated from the control box;

wherein the inline switch has an open configuration and a closed configuration;

wherein current does not flow to the interrupter when the inline switch is in the closed configuration; and wherein the disconnect blade provides an open air gap and operates as a visual indicator when the inline switch is in the open configuration.

2. The switching system as in claim 1, wherein the inline switch further comprises switch electronics for communicating with the control box and for controlling the motorized cabinet.

3. The switching system as in claim 2, wherein the control box remotely controls operation of the inline switch via radio frequency transmission.

4. The switching system as in claim 1, wherein the interrupter is a load break vacuum interrupter.

5. The switching system as in claim 4, wherein the load break vacuum interrupter is arranged in series with other load break vacuum interrupters to allow switching to a desired voltage rating.

6. The switching system as in claim 4, wherein the load break vacuum interrupter is arranged in parallel with other load break vacuum interrupters to allow switching to a desired voltage rating.

7. The switching system as in claim 4, wherein the load break vacuum interrupter is a 38 kV loadbreak vacuum bottle having a current rating up to 3000 A.

8. The switching system as in claim 7, wherein the load break vacuum interrupter is arranged in series with other load break vacuum bottles to allow switching up to 230 kV.

9. The switching system as in claim 1, wherein the inline switch further comprises a gear drive mechanism housed in the motorized cabinet for driving the non-rotating blade of the interrupter.

10. The switching system as in claim 1, wherein the motorized cabinet and inline axial switch electronic component are powered from line power using a current transformer.

11. The switching system as in claim 1, wherein the motorized cabinet and inline axial switch electronic component are powered using a battery.

12. The switching system as in claim 1, wherein the motorized cabinet and inline axial switch electronic component are powered using a capacitive source.

13. The switching system as in claim 1, wherein the inline axial switch is powered from line power.

14. The switching system as in claim 1, wherein the interrupter is operable in high-voltage, high-current load conditions.

15. The switching system as in claim 1, wherein the inline switch further comprises a vacuum interrupter column configured to move inline with the interrupter, whereby the inline switch is in series with a strain insulator, and whereby the inline switch is insulated to ground.

16. A method of actuating a switching system for controlling current through a transmission line, the method comprising:

providing an inline switch disposed within the transmission line and a control box, the inline switch comprising a disconnect blade, an interrupter having a non-rotating blade and mounted axially inline with the disconnect blade, and a motorized cabinet, wherein the control box is connect to the motorized cabinet, and wherein the inline switch is mechanically and electrically isolated from the control box; and remotely controlling, via the control box, operation of the inline switch by operating the motorized cabinet to axially drive the non-rotating blade of the interrupter to open or close the inline switch.

17. The method of claim 16, wherein remotely controlling operation of the inline switch is through radio frequency transmission.

18. The method of claim 16, wherein the interrupter is a load break vacuum interrupter, the method further comprising arranging the load break vacuum interrupter in parallel with other load break vacuum interrupters to allow switching to a desired voltage rating.

19. The method of claim 16, wherein the interrupter is a load break vacuum interrupter, the method further comprising arranging the load break vacuum interrupter in series with other load break vacuum interrupters to allow switching to a desired voltage rating.

20. The method of claim 19, wherein the load break vacuum interrupter is a 38 kV loadbreak vacuum bottle having a current rating up to 3000 A, and wherein the load break vacuum interrupters arranged in series allow switching up to 230 kV.

* * * * *